(12) United States Patent
Periasamy et al.

(10) Patent No.: US 9,785,974 B1
(45) Date of Patent: Oct. 10, 2017

(54) IDENTIFYING MOBILE APPLICATION INSTALLATIONS

(71) Applicant: Rocket Fuel Inc., Redwood City, CA (US)

(72) Inventors: Rajaraman Periasamy, Santa Clara, CA (US); Mark Charles Torrance, San Jose, CA (US); Michael Jared Benisch, Redwood City, CA (US)

(73) Assignee: Rocket Fuel Inc., Redwood City, CA (US)

( * ) Notice: Subject to any disclaimer, the term of this patent is extended or adjusted under 35 U.S.C. 154(b) by 0 days.

(21) Appl. No.: 14/256,710

(22) Filed: Apr. 18, 2014

(51) Int. Cl.
*G06Q 30/02* (2012.01)
(52) U.S. Cl.
CPC ................... *G06Q 30/0267* (2013.01)
(58) Field of Classification Search
CPC ............ G06Q 30/0237; G06Q 30/02; G06Q 30/0278; G06Q 10/30; G06Q 20/382
USPC ....................................... 705/14.64
See application file for complete search history.

(56) References Cited

U.S. PATENT DOCUMENTS

| | | | | |
|---|---|---|---|---|
| 2006/0212350 | A1* | 9/2006 | Ellis | G06Q 30/02 705/14.41 |
| 2012/0036003 | A1* | 2/2012 | Tong | G06Q 30/0207 705/14.39 |
| 2012/0265595 | A1* | 10/2012 | Corner | G06Q 30/02 705/14.23 |
| 2012/0323898 | A1* | 12/2012 | Kumar et al. | 707/723 |
| 2013/0159103 | A1* | 6/2013 | Foroughi et al. | 705/14.53 |
| 2014/0074592 | A1* | 3/2014 | van Elsas et al. | 705/14.45 |
| 2014/0120864 | A1 | 5/2014 | Manolarakis et al. | |

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*

(Continued)

*Primary Examiner* — Namrata Boveja
*Assistant Examiner* — Michael Ezewoko
(74) *Attorney, Agent, or Firm* — Fenwick & West LLP

(57) ABSTRACT

An ad server provides an advertiser with computer code to include in advertisement (ad) instances. Upon interaction with one of the ad instances, the computer code determines if a mobile software application associated with an advertiser is installed on a mobile device. The ad server may also provide mobile application developers with a software development kit (SDK) for use in creating mobile applications capable of determining if a mobile software application associated with the advertiser is installed on a mobile device, retrieving usage information associated with the user's use of the mobile device, receiving ad instances for display to a user through the mobile software application, and communicating this information to the ad server. Based on the installation status and the usage information the ad server selects ad instances to serve to the user of the mobile device.

19 Claims, 6 Drawing Sheets

(56) References Cited

OTHER PUBLICATIONS

Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*

* cited by examiner

IDENTIFYING MOBILE APPLICATION INSTALLATIONS

BACKGROUND

1. Field of Art

This description pertains in general to mobile device software applications, and more particularly to advertising within mobile device software applications.

2. Description of the Related Art

Online advertising has grown significantly in recent years. Web pages often include space for informational content desired by the web page's visitors (or, simply, users), as well as space for advertising (ad) content. The ad space on a web page is generally referred to as ad inventory. The publisher of the web page offers its ad inventory for sale, directly or indirectly, to advertisers. Advertisers purchase advertising space to place individual instances of ad content (or impressions) in front of users visiting the web page. Impressions are presented to the user with the hope of inducing the user to perform some desired act including, for example, clicking on an impression, visiting a specific web page, signing up for online services or news from a particular web page, or purchasing merchandise from yet another web page.

The online ad industry includes many different types of advertisers that represent companies producing a wide variety of goods and services. The supply for ad inventory has dramatically increased as the internet has grown. However, given the wide variety of goods and services to be advertised, not all web pages have ad inventory that is valuable to a given advertiser. Thus, advertisers, often in partnership with third parties such as ad servers, try to identify ad inventory that is valuable to their customers. Ad servers help advertisers target particular web pages and audiences of users, instead of indiscriminately placing ads in front of a large number of users. To do this ad servers collect statistics regarding user traffic on web pages to make better advertising inventory purchase decisions. These statistics include web pages visited by users and the actions taken by those users on the visited web pages. The goal of such targeted advertising is to increase the likelihood that the users receiving ads actually convert.

The proliferation of mobile computing devices (e.g., smartphones) including customizable software platforms has created a new avenue for advertising through software applications installed on such devices. Many advertisers are developing their own branded software applications or partnering with external developers to both provide mobile device users with useful software, and also to provide an additional avenue for advertising to the user. However, installing a software application is not as easy as presenting an ad on a web page. While many users are willing to tolerate ads on web pages, mobile device users are more discerning regarding which software they are willing to install on their mobile device. Thus, advertisers are currently seeking ways to increase mobile software application adoption.

SUMMARY

To assist advertisers and ad servers with understanding mobile software application installations by users on mobile computing devices (mobile devices), an ad server provides an advertiser with computer code to be included in advertisement (ad) instances that are served to mobile devices. The computer code determines if a mobile device software application associated with the advertiser is installed on a mobile device used to view the ad instance. The computer code communicates the installation status to the ad server and/or the advertiser.

The ad server also provides application developers with a software development kit (SDK) to make use of in developing mobile software applications. The SDK enhances the capabilities of a mobile software application to retrieve information associated with a user's usage of the application, retrieve and display ad instances to a user through the application, and communicate the application usage and ad interaction information to the ad server. In some embodiments, the collected usage information is limited to applications associated with the advertiser.

In one embodiment, the ad server determines which ad instances to transmit to the mobile device based on the installation status and usage information. For example, upon identifying that an application associated with an advertiser is not installed on a mobile device, the ad server may promote or send ad instances touting the benefits of the advertiser's software application. Alternatively, if the advertiser application is installed on the mobile device, the ad server may send ad messages promoting in-app purchases, or other ads promoting usage of the application. Further, assuming the advertiser's software application is already installed, the ad server trains a model associated with the user of the mobile device based on the installation status and the application usage information. The model may be used to determine which ad instances to transmit to other mobile device users who have installation and usage patterns that match the model generated for the user. For example, if the model is generated for a user who has installed the advertiser's software application on their mobile device, the model may be used to identify other mobile device users who are likely to install the advertiser's software application.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Computing Environment Overview

Figure 1:
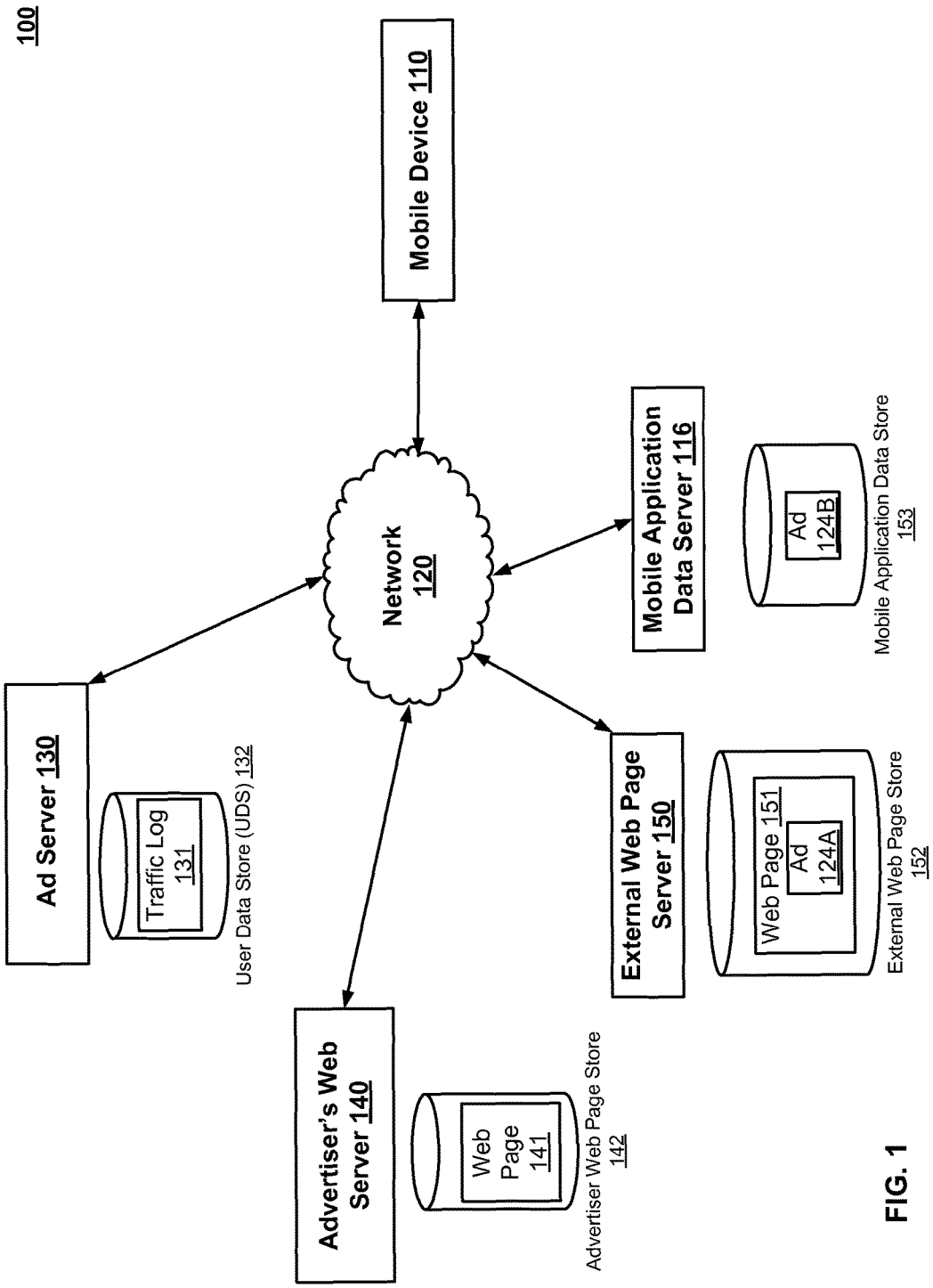
FIG. 1 illustrates a computing environment for delivering web pages including advertising (ad) content to web browsers and software applications installed on mobile devices.

FIG. 1 illustrates a computing environment for delivering web pages including advertising (ad) content to web browsers and software applications installed on mobile devices. The computing environment 100 includes a number of different computing systems including a mobile device 110, an ad server 130, an advertiser's web server 140, an external web page server 150, and a mobile application data server 116, all communicatively coupled through a communications network 120 (e.g., the internet). For example, the computing systems may be programmed to communicate with each other using a networking protocol such as transmission control protocol/internet protocol (TCP/IP). Although only one of each type of computing system is shown, in practice many of each type of entity exists on the internet, and the various instances of each type of computing system interact with each other on a frequent basis.

A user uses a mobile device 110 (e.g., a mobile phone, smart phone, tablet computer, laptop computer, etc.) to view and interact with content provided by web servers, such as the advertiser's web server 140, the external web page server 150, and the mobile application data server 116. Ad instances may be displayed to the user via web browser applications and other software applications installed on the mobile device 110, as described in greater detail in conjunction with FIG. 2.

Web page servers 150 (or web servers) store and communicate web page content to mobile devices 110. In FIG. 1, they are referred to as "external" to distinguish them as being communicatively and physically distinct from an advertiser's web page server 140. Web pages 151 are located at particular internet addresses (e.g., at particular uniform resource locators (URLs)), and generally include informational content such as audio media, video media, and/or interactive computer code. Modern web pages often dynamically respond to user interaction, such that the interaction between the web server 150 and the mobile device 110 can be a back and forth process involving multiple requests and transmissions of content. Many web pages 151 also include ad space for the inclusion of ad instances (or impressions) that will be provided to the mobile devices 110 providing the web page for display. The web server's 150 owner sells the ad space 124A to advertisers 140 as a source of revenue.

Mobile application data servers 116 store and communicate mobile application data to mobile devices 110. This may include the data needed to install a software application on the mobile device 110, as well as content that updates the software application and/or is used in the regular operation of the software application. For example, the mobile application data may be retrieved from the mobile application data server 116, when a user requests that the application be installed on the mobile device 110. Many mobile applications on the mobile device 110 also include ad space 124B for the presentation of ad instances. Similar to web pages, the mobile application data server's 116 owner may sell or contractually agree to provide the ad space 124B to one or more advertisers 140.

Advertisers 140 create ad content to be provided for display within ad spaces on web pages and within mobile applications. Advertisers 140 purchase ad space in order to help drive user traffic to their own web pages 141 and servers 140. For example, provided ad instances may include computer code that redirects the mobile device 110 to load content from the advertiser's web server 140 responsive to receiving an interaction (e.g., a touch input) that corresponds to the provided ad instance. This may be simply a web address, or a more sophisticated algorithm. Advertisers 140 use their web pages 141 to promote and/or sell goods or services to users. In some instances, if an external web page 151 contains ad content, the provided web page 151 will include computer code indicating where the advertiser's ad content can be obtained (e.g., server 140).

Ad servers 130 purchase ad space 124 on behalf of advertisers 140. Generally, ad servers 130 try to purchase ad space 124 that is valuable to advertisers 140. There are many different strategies for determining what an advertiser 140 considers valuable, and so often the ad server 130 will work with the advertiser 140 to determine an ad campaign strategy dictating which ad space 124 the ad server 130 will buy. One strategy involves logging web traffic to web pages and mobile software applications associated with the advertiser 140, and storing the logged web traffic in a user data store (UDS) 132. The logged web traffic 131 provides the ad server 130 with information regarding the activities, interests, habits, and purchasing decisions of users 110. The ad server 130 processes this information to identify which ad space to buy.

While the ad server 130 is depicted as a single entity in FIG. 1 for the sake of discussion, the ad server 130 may represent an ad-delivering system that may be implemented using a variety of architectures and configurations having multiple components, modules, and/or servers in communication. For example, the ad-delivering system may include advertisers, ad-delivering servers, demand side platforms (DSPs), ad networks (horizontal and vertical), ad exchanges, analytic platforms, data management platforms, data aggregators, targeted and behavioral advertising platforms, and/or campaign management systems.

Given the growth in the use of mobile devices 110, many advertisers 140 have developed their own branded software applications to provide to users. However installing software applications on mobile devices 110 require the user to be aware of the availability of the advertiser's 140 software application and to be willing to install the advertiser's 140 software application. One method of informing users of the availability of software applications is to serve ads to a user informing the user of the availability of the advertiser's 140 software application and encouraging the user to install the software application.

However, prior to serving a user ads encouraging the user to install the advertiser's 140 software application, the advertiser 140 or ad server 130 first determines whether the user has already installed the mobile software application. Differentiating in this manner not only prevents wasting campaign dollars on advertising to users who have already installed the advertiser's 140 software application, but further allows the advertiser 140 to target different ad campaigns to users who have already installed the software application on the mobile device 110. Hence, it is beneficial for the ad server 130 or advertiser 140 to determine the installation status of the advertiser's 140 mobile software application before determining which ad to send to a mobile device 110.

To do this, an ad server 130 provides trusted partner advertisers 140 with computer code that the partnered advertiser 140 will include in its ad instances. When a user interacts with an advertiser's 140 ad instance (as served by either the advertiser 140 or ad server 130) the code determines whether a software application associated with an advertiser 140 is installed on the mobile device 110. Upon determining that the advertiser's 140 application is installed on the user device 110, the code launches the advertiser's 140 application thereby allowing the user to use the application. Upon determining that the advertiser's software application is not installed on the user device 110 the code redirects the user to an application distribution platform (e.g., the GOOGLE PLAY STORE on a mobile device 110 including the ANDROID operating system or website associated with the application) to obtain the advertiser's 140 application.

Apart from identifying users who have installed a software application associated with an advertiser 140, advertisers 140 may also be interested in identifying and targeting future ad instances towards users who are likely to install the advertiser's 140 application. Collecting application installation and usage information (e.g., the number of times a user interacted with one or more applications within a given time period) allows the ad server 130 (or advertiser 140) to generate a model that may be used to identify similar users having similar installation patterns and/or application usage information. The advertiser 140 (or ad server 130) may then send ad instances to those users encouraging them to install and/or use the advertiser's 140 application.

To collect application usage information associated with one or more applications on the mobile device 110, the ad server 130 may partner with trusted application developers and provide them with a software development kit (SDK) to make use of in developing their mobile software applications. Use of the SDK allows created applications to collect information associated with the user's usage of the application, retrieve and provide for display ad instances, and communicate the application usage and ad interaction information to the ad server 130 (or advertiser 140).

Because the code or SDK is only provided to advertisers 140 or application developers who have explicitly formed a real world partnership with the ad server 130, the code will only be present in ad instances that trust the ad server 130, and the SDK will only be present in applications whose developers trust the ad server 130. The SDK may also include security, cryptographic, and/or encoding functionality in order to ensure that the collected information does not allow for external real-world identification of particular users or mobile devices 110. Further, communications between an advertiser's 140 mobile software application and the ad server 130 are encrypted, thereby preventing access by other, non-trusted third parties. These aspects also distinguish the ad server's 130 computer code included in the advertiser's 140 mobile software application from code provided by other, non-trusted third parties who may have maliciously inserted code into an advertiser's 140 web page, ad instance, or a developer's application without the advertiser's 140 or developer's permission.

Mobile Device Overview

Figure 2:
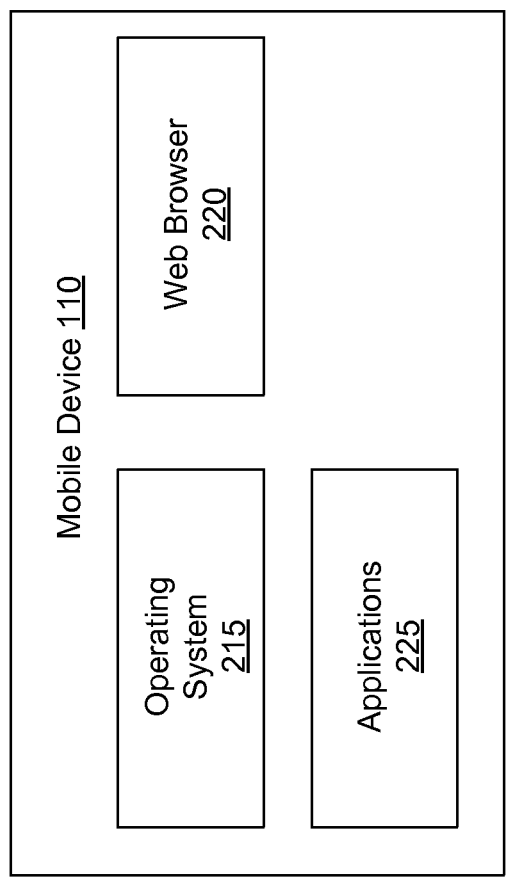
FIG. 2 illustrates an example of a mobile device, according to one embodiment.

FIG. 2 illustrates an example of a mobile device, according to one embodiment. The user interacts with ad instances via software applications 225 installed on the mobile device 110 or via web pages displayed to the user through a web browser 220 installed on the user device.

A web browser 220 allows the user to access web pages provided by web servers, such as the advertiser's web server 140 or other external web page servers 150. Examples of web browsers 220 include Firefox™, Chrome™, Safari™, and Internet Explorer™. An advertiser's 140 ad instance is retrieved and displayed to a user via a webpage using the web browser 220, as described in greater detail in FIG. 3.

As the user interacts with an ad instance via a web page the computer code included in the ad instance is configured to determine whether an application 225 associated with an advertiser 140 is installed on the mobile device 110. In one example, the computer code is in JavaScript™. To determine whether the application 225 associated with the advertiser 140 is installed on the mobile device 110, the computer code is configured to interact with an operating system (OS) 215 installed on the mobile device 110 via the web browser 220. For example, the computer code access the API associated with the web browser 220 to execute function calls associated with the OS 215.

The operating system (OS) 215 (e.g., Darwin, RTXC, LINUX, UNIX, OS X, WINDOWS, iOS, ANDROID or an embedded operating system such as VxWorks) includes various software components and/or drivers for controlling and managing general system tasks (e.g., memory management, storage device control, power management, application management, etc.) and facilitates communication between various hardware and software components. In one example, function calls associated with the OS 215 (via an OS 215 Application Programming Interface (API) for example) may be used to retrieve installation status associated with applications 225 on the mobile device 110. For example, the OS 215 on the mobile device 110 may have a function call (e.g., functions associated with the getPackageManager( ) class for mobile devices 110 running the ANDROID OS) for identifying or listing applications 225 installed on a mobile device 110, or for determining information associated with an application 225 installed on a mobile device 110.

In one example, for a mobile device 110 running an ANDROID OS, the computer code included in the ad instance displayed to the user via a web page may execute the function call getPackageManager( ).getApplicationInfo to retrieve a list of applications 225 installed on the mobile device 110. The computer code then determines from the list of applications 225 installed on the mobile device 110 whether an application 225 associated with an advertiser 140 is installed on the mobile device 110.

On determining whether or not an application 225 is installed on a mobile device 110 the advertiser 140 may be interested in taking an action based on whether the application 225 is installed on the mobile device 110. For example, in the case that the advertiser's 140 application is not installed on the mobile device 110, the advertiser 140 may be interested in encouraging the user to install the advertiser's 140 software application by directing the user to an application distribution platform from which the user may install the advertiser's 140 application. In one example, the computer code includes a deep link to a web page from which the user may install the application associated with the advertiser 140. A deep link in the context of web content, refers to an object such as a hyperlink that links to a specific piece of web content or web page associated with a website as opposed to the home page of the website. The computer code may execute a deep linking hyperlink launching a web page (via the web browser 220) from which the user may download the application associated with the advertiser 140.

Similarly the computer code may also include a deep link to within an application 225 installed on the mobile device 110 from which the user may install the application associated with the advertiser 140. A deep link in the context of applications 225 installed on the user device 110, refers to a function call that launches a specific instance, page, or portion of the application 225 as opposed to the home instance, page, or generic entry point of the application 225. For example, the computer code may execute a deep link causing the GOOGLE PLAYSTORE to launch (via a function call associated with the OS 215), including launching a page associated with the advertiser's 140 mobile software application from which the user may download the application.

Alternatively, upon interaction with an ad instance in the case where the computer code determines that the advertiser's 140 application is already installed on the mobile device 110, the advertiser 140 may want the user to be directed to the advertiser's 140 application. This may allow the user to interact with the content associated with the ad instance to encourage the user to purchase the content associated with the ad instance. In this case, the computer code may execute function calls associated with the OS 215 to launch a particular instance or particular portion of the advertiser's 140 application (via deep linking) associated with the ad instance, thereby allowing the user to interact with the application 225 content without requiring navigation within the application 225 on the part of the user to reach the portion of the application 225 associated with the ad instance.

The computer code included in an ad instance is configured to send the installation status to the ad server 130. To do this, the computer code causes the browser 220 to transmit a message including the installation status to a server identified in the code snippet, such as the ad server 130. In addition to the installation status the message may include information identifying the user or the mobile device 110 such as the internet protocol (IP) address of the mobile device 110 that executes the browser's rendition of the web page, or information identifying the browser type, or a timestamp identifying the time at which the message was sent. Upon receiving the message, the server can store and aggregate this information for later use.

Apart from interacting with ad instances provided via web pages a user may also interact with ad instances provided via an application 225 installed on the mobile device 110. Users of a mobile device 110 interact with the applications 225 on the mobile device 110 to perform an activity such as capturing a photograph using the camera on the mobile device 110, or storing a list of grocery items on the mobile device 110. A user of the mobile device 110 may install the application 225 on the mobile device 110 from one or more locations such as an application distribution platform (e.g., the GOOGLE PLAY STORE) or from a website associated with the application 225. Applications 225 retrieve and display ad instances to the user of the application 225, as described in conjunction with FIG. 3.

As introduced above, the ad server 130 provides application 225 developers with a software development kit (SDK) to make use of in developing an advertiser's 140 mobile software application. The SDK may include functions, that when executed, retrieve a list of applications (via an OS 215 function call as described above) installed on the mobile device 110. The SDK may also include functions, that when executed, collect application usage information associated with the application 225 installed on the user device 110. Examples of application usage information include the frequency at which a user accesses an application 225 within a given time frame, the dates and times at which the user accesses an application 225, game play information associated with game applications 225, tasks performed by the user within the application 225, the time associated with and type of purchases made by the user using the application 225, or information associated with the identity of the user. The SDK may further include functions, that when executed, communicate the installation status and the application usage information to the ad server 130. The ad server 130 may aggregate the application usage information received from one or more applications 225 installed on the mobile device 110, and associate the aggregated information with an identifier identifying the mobile device 110, such as an IP address identifying the mobile device 110.

Figure 3:
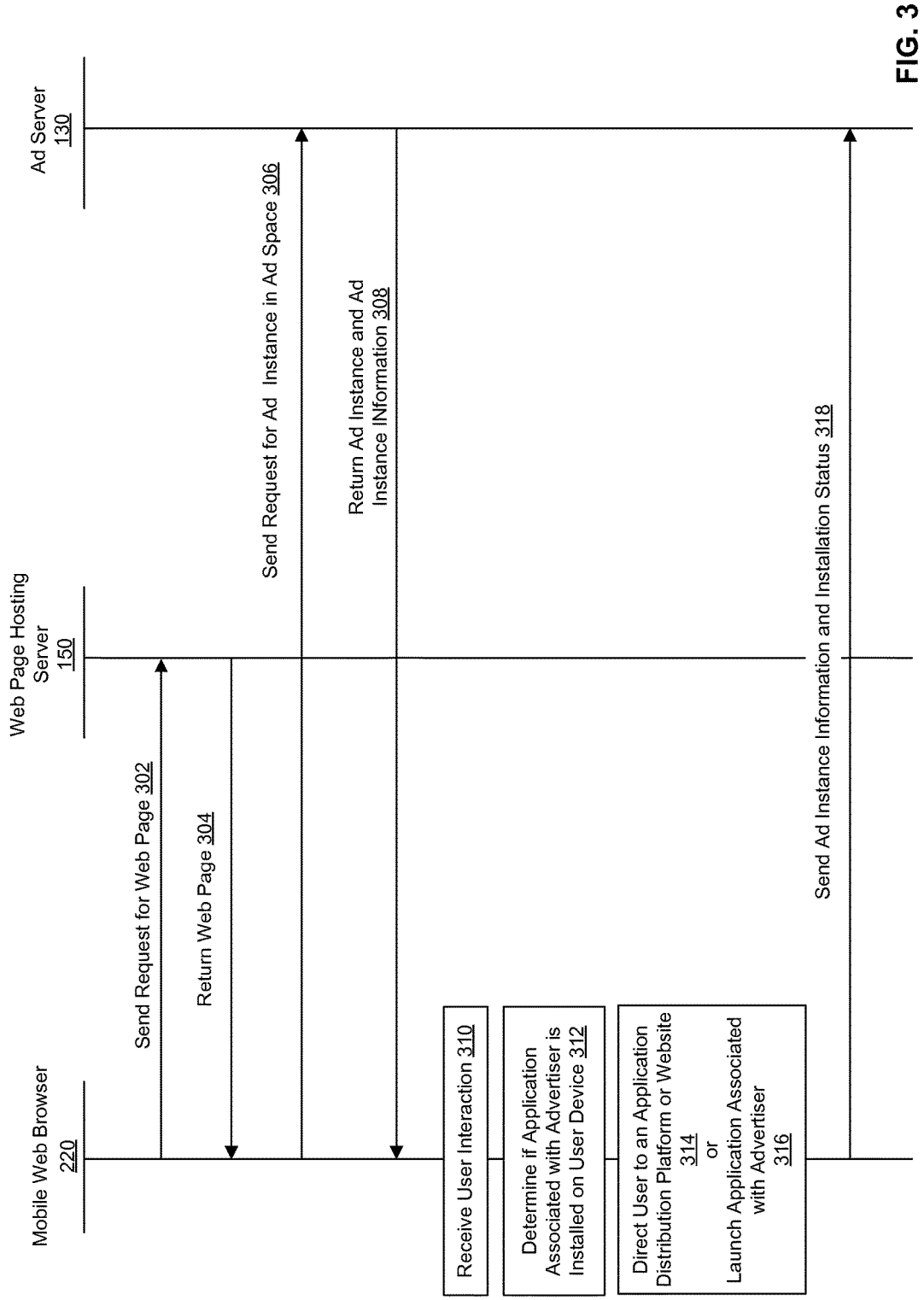
FIG. 3 illustrates an interaction diagram for communicating the installation status associated with an advertiser's software application with respect to a mobile device based on interactions with the advertiser's ad instances provided via a web browser, according to one embodiment.

Communicating Application Installation Status Associated with an Advertiser's Application Installed on a Mobile Device I. Advertisement Instance on Web Page Sends Application Installation Status to Ad Server FIG. 3 illustrates an interaction diagram for communicating an installation status associated with an advertiser's 140 mobile software application with respect to a mobile device 110 based on interactions with the advertiser's 140 ad instances provided via a web browser, according to one embodiment. As the user interacts with the web browser 220 on the mobile device 110, the web browser 220, sends the web page hosting server 150 a request 302 for a web page to display to the user. Responsive to the request 302, the web page hosting server 150 returns 304 a web page to the user's web browser 220 to display to the user. To fill the ad spaces in the web page the web browser 220 sends the ad server 130 a request 306 for an ad instance for the ad space. Responsive to request 306 the ad server 130 returns 308 an ad instance 124A and information associated with the ad instance to the user's web browser 220. In one example, the information associated with the ad instance includes an identifier identifying the ad instance, a time stamp identifying the time at which the ad instance is retrieved, and/or information associated with the advertiser's 140 mobile software application.

On receiving the ad instance the web browser 220 displays the ad instance to the user, as a standalone ad or as part of a web page. The web browser 220 may receive 310 a user interaction (e.g., via touch interaction or mouse click) with the ad instance. Responsive to the user interaction with the ad instance the computer code included in the ad instance determines 312 if an application associated with the advertiser 140 related to the ad instance is installed on the mobile device 110. In the case that the computer code included in the ad instance determines that the application associated with the advertiser 140 is not installed on the mobile device 110, the web browser 220 may direct 314 the user to an application distribution platform or website, prompting the user to install the application associated with the advertiser 140. In the case that the computer code included in the ad instance determines that the application associated with the advertiser 140 is installed on the mobile device 110, the computer code may launch 316 the application associated with the advertiser 140 encouraging the user to interact with the content associated with the ad instance via the advertiser's 140 application. The computer code in the ad instance causes the web browser to send 318 the installation status and information identifying the mobile device 110 to the ad server 130.

Figure 4:
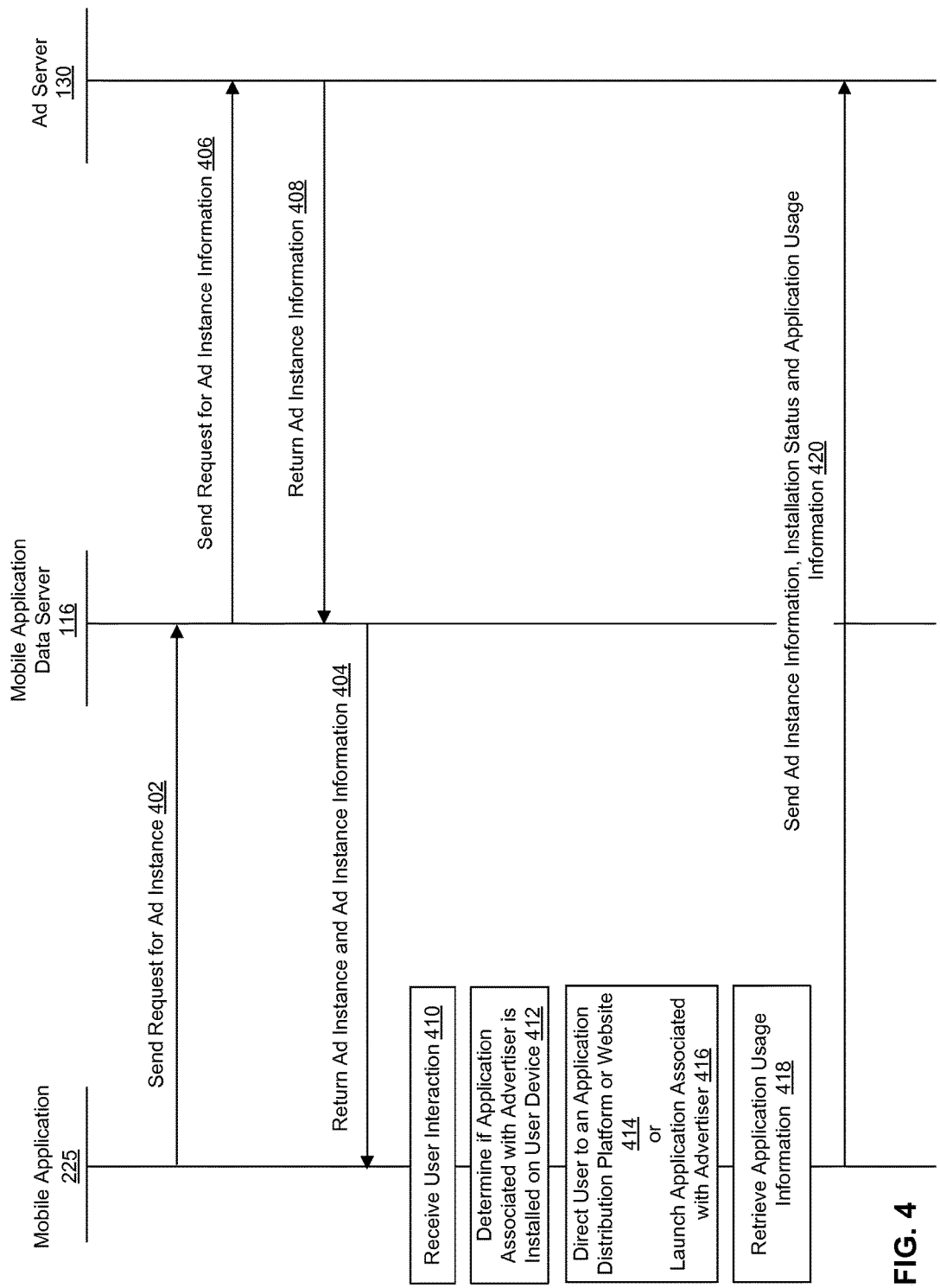
FIG. 4 illustrates an interaction diagram for communicating the installation status associated with an advertiser's software application with respect to a mobile device, according to one embodiment.

Communicating Application Installation Status Associated with an Advertiser's Application Installed on a Mobile Device and Application Usage Information Associated with an Application Installed on the Mobile Device II. Mobile Application Sends Application Installation Status and Application Usage Information to Ad Server FIG. 4 illustrates an interaction diagram for communicating the application installation status associated with an advertiser's mobile software application with respect to a mobile device, according to one embodiment.

The embodiments, describe a method for sending application information to an ad server 130 from an ad instance on a mobile application 225. As the user interacts with the mobile application 225 on the mobile device 110, the application 111 sends the mobile application data server 116 a request 402 for an ad instance 124B to display to the user. Responsive to the request 402, the mobile application data server 116 sends the ad server 130 a request 306 for an ad instance information 406 associated with the ad instance 124B. Responsive to request 406, the ad server 130 returns 408 the ad instance information to the mobile application data server 116, which further returns the ad instance and the ad instance information associated with the ad instance to the mobile application 225. The mobile application 225 displays the ad instance to the user of the mobile device 220.

Similar to FIG. 3, the mobile application 225 may receive 410 a user interaction (e.g., via touch interaction or mouse click) with the ad instance. Responsive to the user interaction with the ad instance the mobile application 225 executes one or more function calls associated with the SDK provided by the ad server 130 to determine 412 if an application associated with the advertiser 140 related to the ad instance is installed on the mobile device 110. In the case that the mobile application 225 determines that the application associated with the advertiser 140 is not installed on the mobile device 110, the mobile application 225 may direct 414 the user to an application distribution platform or website, prompting the user to install the application associated with the advertiser 140. In the case that the mobile application 225 determines that the application associated with the advertiser 140 is installed on the mobile device 110, the mobile application 225 executes a function associated with the SDK provided by the advertiser 140 to launch 416 the application associated with the advertiser 140, thereby encouraging the user to interact with the content associated with the ad instance via the advertiser's 140 application.

The mobile application 225 may also retrieve 418 application usage information associated with the application 225 on the mobile device 110, by executing one or more functions associated with the SDK provided by the ad server 130. The mobile application sends 420 the ad instance information, the application installation status and the application usage information to the ad server 130.

Example Uses of Mobile Application Installation and Usage Information

I. Provide Data to Advertisers

In one embodiment, the ad server 130 provides collected application information to advertisers 140 associated with those applications. An advertiser 140 may be interested in identifying the number of users who have installed an application associated with the advertiser 140 on the mobile device 110. For example, an online book store may be interested in determining the number of users interested in the online book store who have also downloaded the application associated with the online book store. Further, advertisers 140 may be interested in the results of their efforts in encouraging users to download applications associated with an advertiser 140. For example, the collected information may identify how many people installed applications 225 as a result of the ad campaign. Application usage information is similarly useful. Collected usage information allows the advertiser 140 to see how users use their mobile software applications 225. Depending upon the embodiment, it may also provide information about other applications 225 that the user also uses. The advertiser 140 may use the collected usage information to update the application 225 to better serve the user's interests.

II. Installation-Based Service of Advertisements

In one embodiment, the ad server 130 or advertiser 140 uses installation status and usage information to determine which ads are served to a mobile device 110 through the web browser or installed applications 225. For example, the ad server 130 may differentiate ads served to a user of a mobile device 110 based on the installation status or usage information associated with an application 225 installed on a mobile device 110. Differentiating ad instances served to the user based on whether an application associated with an advertiser 140 is installed on a mobile device 110 is beneficial to the advertiser 140 to save wasting ads on users who already have the mobile software application 225, and instead allowing further targeting based on the usage information associated with those users.

Figure 5:
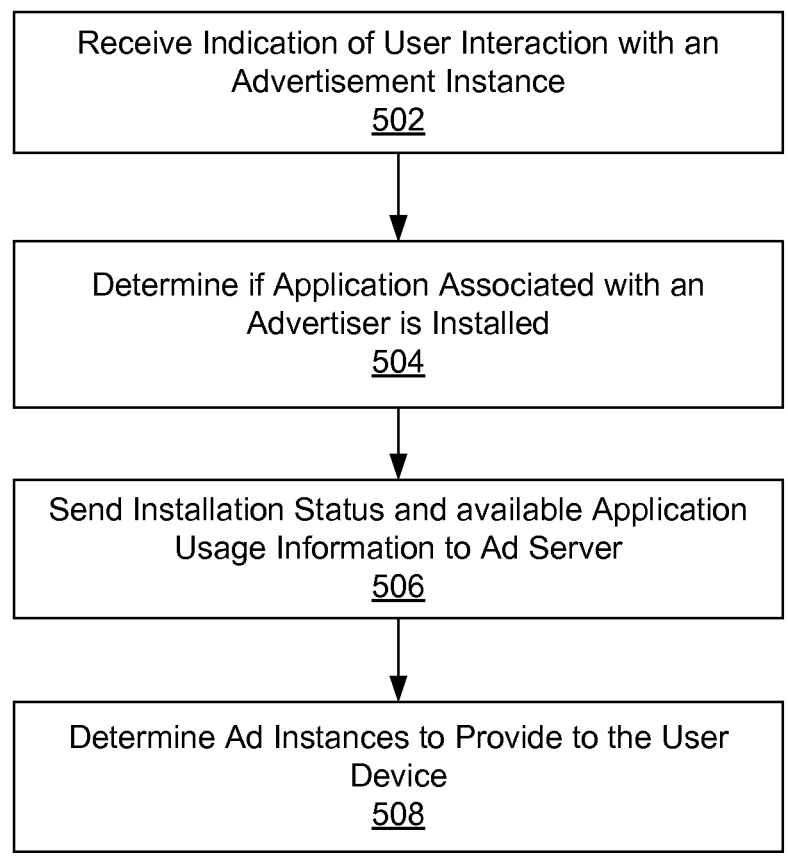
FIG. 5 is a flowchart illustrating an example process for using the installation status for an advertiser's mobile software application to determine which ad instances to provide to a mobile device, according to one embodiment.

FIG. 5 is a flowchart illustrating an example process for using application installation status to determine which ad instances to provide to a mobile device 110, according to one embodiment. The ad instance displayed to the user via a web page or a mobile application receives 502 a user interaction. On receiving a user interaction either the code included in the ad instance (in the case of the ad instance being provided to the user via a web page) or the mobile application 225 with which the user is currently interacting with, determines 504 if the application 225 associated with the advertiser 140 is installed on the mobile device 110. The mobile application 225 may also retrieve application usage information associated with the application 225 installed on the mobile device 110. The computer code included in the ad instance displayed to the user via a web page sends 506 the installation status to the ad server 130. The mobile application 225 sends the installation status, and the application usage information to the ad server 130. In addition, identifying information for such as the internet protocol (IP) address of the mobile device 110 may also be sent to the ad server 130. Upon receiving the information, the ad server 130 stores and aggregates this information to make future ad targeting decisions.

In one embodiment, upon determining that the user does not have the application installed on their mobile device 110, the ad server 130 or advertiser 140 serves ad instances to a user of a mobile device 110 encouraging the user to download an application associated with the advertiser 140. For example, the ad server 130 may receive installation status from computer code included in an ad instance displayed to a user, identifying that a user of a mobile device 110 does not have an application 225 associated with an advertiser 140 installed on their mobile device 110. The ad server 130 may then direct ads to the IP address associated with the mobile device 110, encouraging the user to install the advertiser's 140 application. In another example, the ad server 130 may identify that the IP address associated with the mobile device 110 has already been served a threshold number of ads encouraging the user to install the advertiser's 140 software application. Given that the user still has not installed the application after being served the threshold number of ads, the ad server 130 may choose to serve the user ad instances belonging to another type of ad campaign, as the user is unlikely to install the application associated with the advertiser 140.

On identifying that the application associated with the advertiser 140 is installed on the mobile device 110, the ad server 130 may no longer send ad instances encouraging the user to install the application associated with the advertiser 140 to the IP address associated with the mobile device 110, but may instead send the user ad instances encouraging the user to engage with the application 225, such as ad instances including discounts for purchases made using the advertiser's 140 application. The ad server 130 may determine which ad instances to serve to a user of a mobile device 110 based on the application usage information associated with the user. For example, the ad server 130 may receive application usage information indicating that a user purchased a product using an application 225 on the mobile device 110. The ad server 130 may then serve ad instances associated with similar products that the user may be interested in to the IP address associated with the mobile device 110, or to the advertiser's 140 application installed on the mobile device 110. In another example, the ad server 130 determines, based on the application usage information, that the user seldom uses the productivity applications installed on the mobile device 110. The ad server 130 may then refrain from serving the user ad instances associated with productivity applications 225, or encouraging the user to install one or more productivity applications 225.

III. Developing a Model for Application Usage/Installation Prediction

In one embodiment, the ad server 130 or advertiser 140 may develop a lookalike model based on the installation statuses and the application usage information from many different mobile devices 110. The lookalike model reflects estimations of characteristics associated with the users of those mobile devices 110. The characteristics may include, purchasing patterns, patterns indicating the content users are likely to be interested in, engagement patterns, application 225 usage patterns, and installation patterns. The lookalike model may be used by advertisers 140 and the ad server 130 to predict applications a user is likely to download and install on their mobile device 110, or applications 225 a user is likely to be interested in engaging with on their mobile device 110. The lookalike model may also be used to predict what ad instances to display to a user based on the likeliness of the user being interested in the ad instance.

Figure 6:
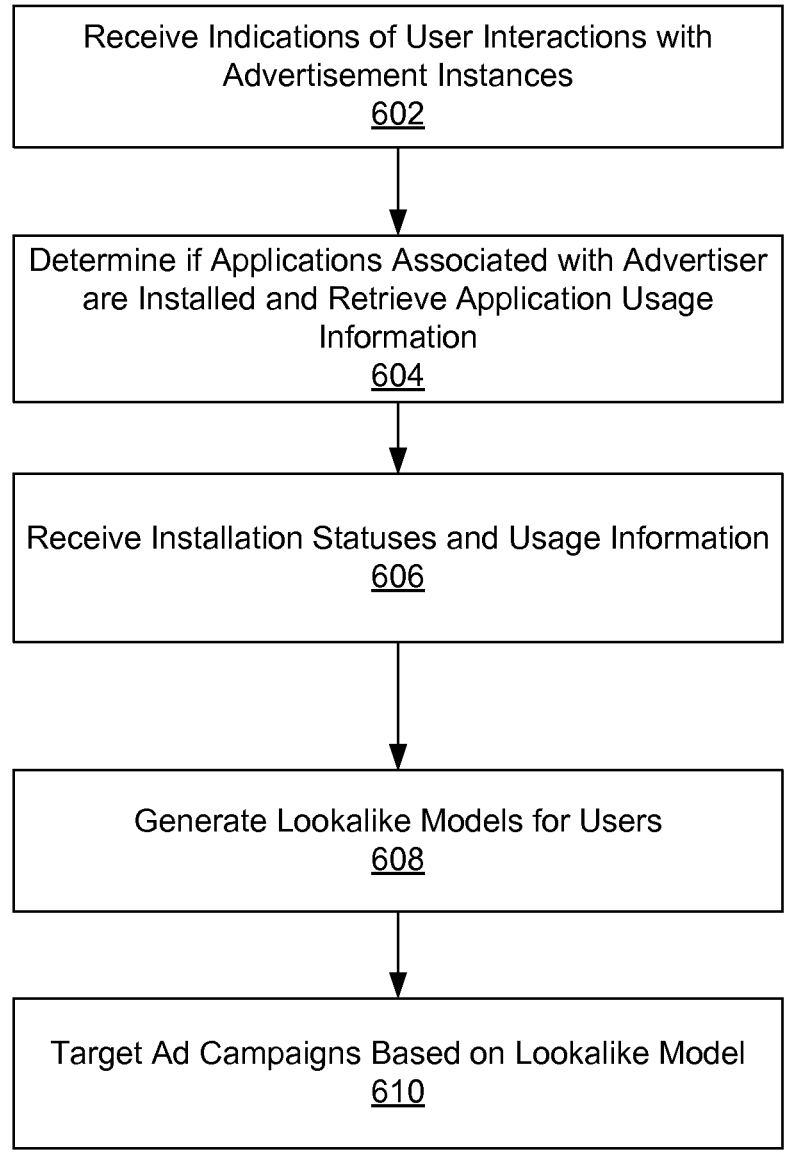
FIG. 6 is a flowchart illustrating an example process for targeting ad campaigns based on a model generated from an installation status and application usage information received from a mobile device for an advertiser's mobile software application, according to one embodiment.

FIG. 6 is a flowchart illustrating an example process for targeting ad campaigns based on a model generated from installation status and application usage information received from mobile devices 110, according to one embodiment. To train the model, ad instances are displayed to users via web pages or mobile applications. Upon receiving user interactions, either the code included in the ad instances (in the case of ad instances being provided to user via web pages) or in mobile applications, the mobile devices determine 604 if applications associated with the advertiser 140 are installed on the mobile devices 110. The mobile applications may also retrieve 604 application usage information. The computer code included in the ad instances or applications send 606 the installation status the application usage information, and in some cases identifying information to the ad server 130. The ad server 130 stores and aggregates the received information.

The ad server 130 develops one or more lookalike models 608 for the users based on the received information. In one embodiment, a lookalike model is developed using machine learning principles. For example, the ad server 130 may store a set of features to be associated with the users. Examples of features include applications 225 installed by users, time periods of day of mobile device 110 usage, the ad instances the users interact with, webpage browsing behavior, user demographic information including age, gender, and geographic location, mobile device 110 type, browser type, in-app purchases made by users, and so on. The ad server 130 may further store a set of features associated with ad instances or ad campaigns, and may also include a set of features specific to the advertiser's 140 mobile software application.

In one embodiment, to develop the model the ad server 130 may use training sets of data that are used to determine weights for the features associated with various users. The training sets may include outcomes of interest to the advertiser 140, where the outcomes of the training sets are used to derive the weights for the features. For example, whether or not the advertiser's 140 mobile software application is installed on a given mobile device 110 may be one type of outcome. In this example, instances of data in a training set may assign features weights of 1 where the mobile application 225 is installed, and weights of 0 otherwise. Aggregated over many training sets, more accurate values for the weights may be determined (e.g., a value between 0 and 1). Interaction with received ad instances may be another type of outcome. Application usage information may be yet another type of outcome.

The received installation status, usage information, and identifying information may be used as training set data for the lookalike model 608. Based on the lookalike model the ad server 130 may target 610 ad campaigns to one or more users. For example, the ad server 130 may use the lookalike model to identify features associated with mobile device 110 users who share features in common with users who have installed the advertiser's 140 mobile software application. Similarly the ad server 130 may avoiding sending ad instances promoting installation of the mobile software application 225 to users who share features with users who have received one or more ad instances regarding the mobile software application 225 but who have still not installed the software application 225. Other types of targeting 610 based on the lookalike model are also possible. For example, ad instances promoting in-app purchases may be sent to users who share features indicating a preference to making in-app purchases.

Additional Considerations

Various embodiments may be implemented in the form of computer code for use with a computer system. The code includes instructions for operating computer systems, and can be stored on a variety of persistent, non-transitory computer-readable storage media. Illustrative persistent computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

The invention claimed is:

1. A method executed by one or more processors of a mobile device, the method comprising:

receiving, from a content source computing system, media content, the media content including at least one ad inventory slot;

transmitting, via a computer network, a request for an ad to fill an ad inventory slot of the at least one ad inventory slot;

receiving, via the computer network from an ad server, the ad server different from the content source computing system, an ad instance of an advertiser to fill the ad inventory slot, the ad instance comprising ad media content for display on a display of the mobile device, the ad instance further comprising computer code configured to execute responsive to user interaction;

displaying, on the display of the mobile device, the ad media content, wherein the ad media content of the ad instance is displayed in one of the at least one ad inventory slots;

receiving an interaction with the ad media content of the ad instance from a user of the mobile device; and responsive to receiving the interaction, executing the computer code of the ad instance, wherein the computer code of the ad instance includes instructions to perform:

executing an operating system function to determine an installation status of the mobile software application;

responsive to the installation status indicating that the mobile software application is installed on the mobile device, executing an operating system function to activate the mobile software application; and responsive to the installation status indicating that the mobile software application is not installed on the mobile device, executing an operating system function to activate an application distribution platform prompting the user to install the mobile software application associated with the ad instance.

2. The method of claim 1, further comprising:
displaying the ad instance with at least one of a web browser installed on the mobile device and another application installed on the mobile device.

3. The method of claim 1, wherein the mobile software application comprises computer code for collecting information regarding usage of applications installed on the mobile device.

4. The method of claim 3, further comprising:
executing the mobile software application to collect the usage information; and
sending the usage information to the ad server.

5. The method of claim 1, wherein the ad instance further comprises computer code instructing the mobile device to send the installation status to the ad server.

6. The method of claim 1, wherein the ad instance further comprises computer code instructing the mobile device to:
retrieve identifying information for the mobile device; and
send the identifying information to the ad server.

7. The method of claim 1, further comprising:
receiving a subsequent ad instance from the ad server, the subsequent ad instance having been selected by the ad server based on the installation status.

8. A method executed by one or more processors of an ad server, the method comprising:
receiving, via a computer network, a request for an ad to fill an ad inventory slot;
sending, via the computer network, an ad instance of an advertiser from an ad server to a mobile device, the ad instance comprising ad media content for display on a display of the mobile device, the ad instance further comprising computer code configured to execute responsive to user interaction;

wherein the computer code of the ad instance includes instructions to perform:
  call for execution an operating system function to determine an installation status of the mobile software application;
  responsive to the installation status indicating that the mobile software application is installed on the mobile device, executing an operating system function to activate the mobile software application; and
  responsive to the installation status indicating that the mobile software application is not installed on the mobile device, executing an operating system function to activate an application distribution platform prompting the user to install the mobile software application associated with the ad instance;

receiving, from the mobile device at the ad server, an indication that a user of the mobile device interacted with the ad instance, the received indication including the installation status;

receiving a second request for ad content for the mobile device;

selecting, from a plurality of ad instances, a subsequent ad instance to send to the mobile device, the selection based on the installation status; and sending, via the computer network, the selected ad instance to the mobile device.

9. The method of claim 8, further comprising:
receiving usage information associated with applications installed on the mobile device, the applications including the mobile software application associated with the advertiser; and
wherein the selection is further based on the received usage information.

10. The method of claim 8, wherein the installation status indicates that the mobile software application associated with the advertiser is not installed on the mobile device.

11. The method of claim 10, wherein the selected ad instance comprises ad content encouraging the user of the mobile device to install the mobile software application associated with the advertiser.

12. The method of claim 8, wherein the installation status indicates that the mobile software application associated with the advertiser is installed on the mobile device.

13. The method of claim 12, wherein the selected ad instance comprises ad content encouraging the user of the mobile device to use the installed mobile software application associated with the advertiser.

14. A non-transitory computer-readable storage medium comprising an ad instance of an advertiser, the ad instance executable by one or more processors of a mobile device, causing the mobile device to:
display ad media content of the ad instance in an ad inventory slot in media content received from a content source computing system, the mobile device configured to receive the ad instance via a computer network from an ad server different than the content source computing system;
responsive to a user interaction with the ad media content of the ad instance being received at the mobile device;
executing an operating system function to determine an installation status of a mobile software application associated with the advertiser on the mobile device;
responsive to the installation status indicating that the mobile software application is installed on the mobile device, executing an operating system function to activate the mobile software application; and responsive to the installation status indicating that the mobile software application is not installed on the mobile device, executing an operating system function to activate an application distribution platform prompting the user to install the mobile software application associated with the ad instance.

15. The non-transitory computer-readable storage medium of claim 14, wherein the mobile software application comprises computer code for collecting information regarding usage of applications installed on the mobile device.

16. The non-transitory computer-readable storage medium of claim 15, wherein the ad instance executable by the processor causes the mobile device to:

execute the mobile software application to collect the usage information; and send the usage information to the ad server.

17. The non-transitory computer-readable storage medium of claim 14, wherein the ad instance executable by the processor causes the mobile device to:

retrieve identifying information for the mobile device; and send the identifying information to the ad server.

18. The non-transitory computer-readable storage medium of claim 14, wherein the ad instance executable by the processor further causes the mobile device to:

send the installation status to the ad server.

19. The non-transitory computer-readable storage medium of claim 14, wherein the ad instance executable by the processor further causes the mobile device to:

receive a subsequent ad instance from the ad server, the subsequent ad instance having been selected by the ad server based on the installation status.

\* \* \* \* \*